(12) United States Patent
Shepherd (10) Patent No.: US 9,636,760 B2
(45) Date of Patent: May 2, 2017

(54) PIPE CUTTING APPARATUS

(71) Applicant: Peta Anne Shepherd, Liss (GB)

(72) Inventor: Benjamin Roland Walter Fermor Shepherd, Liss (GB)

( * ) Notice: Subject to any disclaimer, the term of this patent is extended or adjusted under 35 U.S.C. 154(b) by 318 days.

(21) Appl. No.: 14/359,092

(22) PCT Filed: Nov. 14, 2012

(86) PCT No.: PCT/GB2012/000837
§ 371 (c)(1),
(2) Date: May 17, 2014

(87) PCT Pub. No.: WO2013/072652
PCT Pub. Date: May 23, 2013

(65) Prior Publication Data
US 2016/0114414 A1    Apr. 28, 2016

(30) Foreign Application Priority Data

Nov. 18, 2011  (GB) .................................. 1119943.7

(51) Int. Cl.
*B23B 5/16* (2006.01)
*B23D 21/04* (2006.01)
(52) U.S. Cl.
CPC .............. *B23D 21/04* (2013.01); *B23B 5/163* (2013.01); *B23B 2215/72* (2013.01); *B23B 2220/04* (2013.01)
(58) Field of Classification Search
CPC ........ B23D 21/04; B23D 21/00; B23B 5/163; B23B 5/16; B23B 5/167; B23B 5/08;
(Continued)

(56) References Cited

U.S. PATENT DOCUMENTS 4,213,357 A * 7/1980 Lively .................... B23D 21/04
82/113
4,543,861 A * 10/1985 Kwech .................... B23B 5/162
82/113

(Continued)

*Primary Examiner* — Will Fridie, Jr.
(74) *Attorney, Agent, or Firm* — Taylor Russell & Russell, P.C.

(57) ABSTRACT

A pipe cutting apparatus (10), especially for cutting or machining a plastics, resin or soft-metallic pipe (20), comprises a frame (30a, 30b; 32a, 32b) for receiving the pipe (20) to be cut, and cutting means (102) rotatable by externally powered drive means (60) with respect to the pipe (20) to perform a cut, wherein the cutting means (102) comprises a cutting tool (102) carried on a pivotally mounted tool holder (100) and biased into cutting relationship with the outer surface of the pipe (20) by biasing means such as a coil spring (104). The tool holder (100) on which the cutting tool (102) is mounted preferably further comprises means (106) for limiting the maximum depth of a single given cut able to be performed in a single pass by the cutting tool (102) as it is rotated with respect to the pipe (20) held in the frame, as well as limiting means (108) for defining the maximum depth of a plurality of cuts able to be performed by that plurality of cuts of the cutting tool (102) as it is rotated through that plurality of cutting revolutions with respect to the pipe (20) held in the frame. Examples of pipe cutting or machining operations the apparatus may be used for include:

complete cutting-through of the pipe wall, eg. by a transverse cut;
partial cutting-through of an outer surface or wall of the pipe;
stripping of one or more outer layers from the outer surface of the pipe, to allow the pipe to be joined to another by butt-fusion;
removal of irregularities from the outer surface of the pipe, for providing a cut end of the pipe with a clean, (Continued)

smooth outer surface of substantially uniform diameter to allow the pipe to be joined to another by electro-fusion;

bevelling, chamfering or other shaping of the edge(s) of a cut pipe end, mouth or lip.

17 Claims, 6 Drawing Sheets

(58) Field of Classification Search
CPC ....... B23B 5/14; B23B 5/161; B23B 2215/72; B23B 25/06; B26D 3/16; B26D 3/001
See application file for complete search history.

(56) References Cited

U.S. PATENT DOCUMENTS

| | | | |
|---|---|---|---|
| 5,054,342 A * | 10/1991 | Swiatowy | B23B 5/163 82/113 |
| 9,050,669 B2 * | 6/2015 | Coakley | B23B 5/08 |
| 9,138,808 B2 * | 9/2015 | Walton | B23B 5/14 |
| 9,278,417 B2 * | 3/2016 | Pierce | B23D 21/04 |
| 9,475,160 B2 * | 10/2016 | Coakley | B23Q 1/25 |
| 2016/0114414 A1* | 4/2016 | Shepherd | B23D 21/04 82/1.11 |

* cited by examiner

PIPE CUTTING APPARATUS

TECHNICAL FIELD

This invention relates to a pipe cutting apparatus, more particularly to a pipe cutting and/or machining apparatus for mounting externally on a pipe and comprising a cutter assembly head which is rotatable about the pipe to impart one or more particular cutting and/or machining operations to the pipe.

As used herein, the term "pipe cutting" encompasses not only cutting completely (or partially) through a pipe wall, but it also includes pipe "machining", in which a pipe's wall or end (or mouth) surface or lip is machined by a cutting action so as to modify its shape or appearance.

BACKGROUND ART

The prior art has many examples of pipe cutting or machining apparatus which can be mounted onto a pipe and includes a tool head carrying a selected tool for performing a particular desired cutting or machining operation, such as grooving or cutting-off. One such type of apparatus comprises a frame which can be easily and quickly mounted on the pipe, drive means for rotating the tool head around the pipe, and means for advancing the tool towards the pipe as the tool head is driven therearound.

One example of such an apparatus is the portable lathe shown in U.S. Pat. No. 4,543,861. Here a tool head, rotatable on a mandrel engageable within a pipe, carries a tool for either a cutting-off or bevelling operation. Advancement of the tool radially with respect to the pipe is achieved by a mechanism comprising a tool-advancing cam carried on a stationary element of the tool head and which intermittently transmits movement via a one-way clutch to the tool head through a rigid linkage including a feed screw associated with a tool slide. This tool-advancing mechanism is however relatively complex, because of the necessity for the linkage to be of variable length, so it can be adapted to cut the pipe at various angles.

Another example of a pipe cutting or machining apparatus is my own earlier design shown in published International patent application WO2007/052035. In this improved construction, which makes the job of cutting or machining a pipe quicker and easier for an operator, a two-part hinged holder clamps the pipe externally and a cutting head supported thereon is rotatable around the pipe to perform the cutting operation. The cutting head includes a blade whose advancement radially towards the pipe is governed by an indexing mechanism fixed to the frame and including a snail cam and pawl and ratchet device which incrementally advances the cutting blade radially inwardly towards the pipe's axis in response to completion of each revolution of the cutting head about the pipe.

Whilst the above apparatus of WO2007/052035 is an improvement in certain respects upon other known pipe cutting or machining apparatuses, it still relies on a relatively complex tool advancement mechanism, and one that demands quite high engineering of a relatively large number of interconnected moving parts. By its very nature therefore, the blade advancing mechanism is prone to high levels of wear through normal use, thus reducing its working life, and also propensity to damage or malfunction from ingress of dirt and foreign bodies that are frequently typical of environments in which the apparatus is to be used, eg. building sites.

DISCLOSURE AND SUMMARY OF THE INVENTION

It is therefore a primary object of the present invention to solve or ameliorate at least some of the above problems associated with prior art pipe cutting or machining apparatuses, by providing an apparatus of the above-defined type but which employs a cutting tool advancement mechanism having a simpler and more efficient construction and operation.

Accordingly, in a first aspect the invention provides a pipe cutting apparatus comprising a frame for receiving a pipe to be cut, and cutting means, the cutting means and the pipe being relatively rotatable with respect to each other to perform a cut, wherein the cutting means comprises a cutting tool biased into cutting relationship with the pipe by biasing means.

Preferably the biasing means acts on the cutting means with a substantially constant biasing force, especially whilst in its cutting relationship with the pipe. The biasing force is preferably directed generally radially inwardly with respect to the pipe. In preferred embodiments the biasing means comprises a spring, for example a coil spring or leaf spring. Practical examples of such springs are well known in the art. The biasing means is preferably mounted on and retained on or within the frame by retaining means, eg. a clip, lug, spigot or retaining pin.

It is thus a characteristic feature of embodiments of the apparatus of the invention that the biasing of the cutting means into its cutting relationship with the pipe is independent of its rotational position with respect to the pipe and also independent of the number of revolutions it may have completed with respect to the pipe in an overall multi-revolution cutting procedure.

A primary feature of the invention therefore is to provide a pipe cutting or machining apparatus in which, in effect, the cutting means automatically self-advances into, and maintains its own, optimum cutting configuration with respect to the pipe under the prevailing (and preferably substantially constant) biasing force of the biasing means, without the need or action of an incremental advancement mechanism based on a cam, gear or ratchet device, as is the case with prior art apparatuses such as that of WO2007/052035. This greatly simplifies the overall cutter positioning mechanism, leading to fewer moving parts and less propensity for mechanical wear and possible failure, especially in dirty working conditions.

In embodiments of the invention the apparatus preferably further comprises drive means for rotating the cutting means and the frame relative to each other. Preferably the cutting means is carried on a rotatable tool carrier in the form of a circular or annular ring mounted on an axially oriented circular rotational bearing arranged within the frame, and the tool carrier and frame are rotatable with respect to each other by the drive means. The cutting means may conveniently be located within a machined or moulded recess (or cavity) formed in a section of the rotatable tool carrier ring. The rotatable tool carrier ring may for example be contained within an annular channel (or cavity) machined or moulded into the frame. Preferably the drive means is mounted on the frame and acts on the tool carrier to rotate it within the (preferred) annular channel in the frame about its (preferred) axially-oriented bearing and circumferentially with respect to the pipe. The drive means may conveniently incorporate a gear mechanism, in order to permit or achieve suitable rotational speeds of the cutter assembly around the pipe during a cutting operation. The drive means may be manually powered or powered by an external power source, eg. electric. An example of a suitable electrically powered drive means is an electric power drill.

In preferred embodiments of the apparatus of the invention the cutting means comprises a cutting tool carried on a tool holder. The tool holder is preferably mounted pivotally on (or with respect to) the frame. The tool holder may thus conveniently be mounted on (or with respect to) the frame via a pivot pin or similarly-acting hinged or pivoting mounting means.

In preferred constructions of the above preferred form of cutting means, the tool holder comprises a guide shoe in which the cutting tool is carried. The guide shoe preferably has a leading edge which defines between it and a tip of the cutting tool (remote from the guide shoe) a first distance defining the maximum depth of a single given cut able to be performed in a single pass by the cutting tool as it is rotated with respect to a pipe held in the frame.

Furthermore in especially preferred constructions of the above preferred form of cutting means, the tool holder additionally comprises a limiting means, eg. a stop bar, located radially outwardly of the guide shoe. The limiting means preferably has a riding edge which defines between it and a tip of the cutting tool (remote from the limiting means) a second distance defining the maximum depth of a plurality of cuts able to be performed by that plurality of cuts of the cutting tool as it is rotated through that plurality of cutting rotations with respect to a pipe held in the frame. By selecting a desired or required such second distance, the cutting through—or partial cutting through to a predetermined depth—of pipes of varying wall thicknesses may be readily and efficiently accomplished.

In practical embodiments the cutting tool may be any of a wide variety of tools for carrying out one or more particular desired cutting or machining operations on the pipe, or even on just an end thereof. For example, suitable cutting tools may be selected from those constructed and/or configured for performing any of the following: cutting-through of the pipe wall, eg. especially transverse to its longitudinal axis; partial cutting-through of an outer surface or wall of the pipe, eg. spaced from a cut end thereof, such as for facilitating removal of one or more outer layers of the pipe (such as a plastics coating from a resin pipe) to allow the pipe to be joined to another eg. by butt-fusion; removal of irregularities from the outer surface of the pipe, eg. for providing a cut end of the pipe with a clean, smooth outer surface of substantially uniform diameter to allow the pipe to be joined to another eg. by electro-fusion; bevelling or chamfering of the edge(s) of a cut pipe end, eg. at an acute or an obtuse angle with respect to the pipe's longitudinal axis; or some other alteration or modification of the shape or profile of an already cut end, end portion, mouth or lip of the pipe. Practical examples of cutting tools suitable for any of the above jobs are readily available in the technical and trade literature.

In particularly preferred embodiments of the apparatus, the cutting head assembly, in particular (any and all of) the preferred components of the cutting means, that is to say the biasing means, retaining means (for the biasing means), cutting tool, tool holder, guide shoe, and limiting means are preferably bounded or shielded by (even predominantly closed off by, or encased within, or substantially surrounded by) one or more cover means, such as in the form of at least one cover plate, for substantially preventing or assisting prevention of ingress of foreign bodies or particles (eg. sand or dirt) into the cutting assembly and its component parts. This may be especially useful when one considers that the apparatus may often be used on eg. a building site, where conventional pipe cutting or machining apparatuses may be expected to have only a relatively short life expectancy (perhaps before needing repair or refurbishment) or be rendered unfit for purpose after an inefficiently short period in the worst and dirtiest of working conditions.

In practice it may not be necessary for the apparatus of the invention to be provided with specific disengagement means for withdrawing the cutting means from its cutting engagement with the pipe, although it is possible within the scope of the invention for such means to be provided, such as in the form of a catch or lever that acts against the force of the biasing means to withdraw the cutting means in a generally radially outward direction with respect to the pipe. In many practical instances, however, such withdrawal of the cutting means may if required be achieved simply and effectively by, for example, an operator manually manipulating the cutting means against the biasing force of the biasing means, or it may simply not be necessary at all. In other words, the cutting means may simply be allowed to adopt its maximum radially inwardly advanced position as a rest condition, and the simple action of applying the frame around a pipe brings the cutting means into abutment with the outer wall of the pipe, forcing the cutting means radially outwardly against the force of the biasing means so as to adopt its starting configuration in contact with the outer pipe surface and thus ready for the beginning of a given cutting operation.

In preferred embodiments of the apparatus according to the invention, the frame comprises a pair of articulated frame sections hinged with respect to each other to permit a pipe to be inserted therebetween and the frame sections closed around the pipe to clamp it therebetween. Preferably each frame section is a semi-annular or semi-cylindrical frame section (ie. a half-shell), the two frame sections preferably being symmetrical. Preferably the frame includes at least one locking means for locking the frame sections in their closed, clamping configuration. Preferably a pair of such locking means is provided, spaced apart on the frame in an axial direction with respect to the pipe. The or each locking means is preferably an over-centre locking clamp device, examples of which are well-known in the art. If desired or necessary, the frame may include adjustment means for altering the internal diameter of the space between the frame sections, in order that the frame may accommodate and clamp pipes of varying diameter.

In preferred embodiments the frame of the apparatus comprises a first frame part for primarily supporting and clamping the pipe at a first axial location thereon and on which is mounted the cutting means (and, in preferred embodiments, its associated rotatable carrier), and a second frame part axially spaced from the first frame part for secondarily supporting and clamping the pipe at a second axial location spaced from the first axial location on the pipe. The first and second frame parts may be joined by one or more, preferably a plurality of (especially a plurality of equi-angularly disposed), axially extending parallel connecting members, struts, rods or arms. By use of this dual, axially-spaced support and clamping arrangement, an improved degree of alignment accuracy may be achieved between the pipe and the cutter assembly, so that greater accuracy of a transverse cut or specific types of machining of a cut pipe end may be attained.

The frame of the apparatus of the invention may conveniently be made from any suitable strong, rigid material, for example cast or moulded metal. Alternatively, suitably tough and rigid plastics material may be used.

The present invention is applicable to the cutting or machining of pipes made from a variety of materials, such as are commonly used in various practical applications for the transport of fluids such as liquids (eg. water) or gases. Pipes made of plastics or resin material (eg. PVC or uPVC) are an especially preferred application of the invention. This is primarily due to the relatively low hardness of such materials, which is preferred over much harder materials such as (many) metals and ceramics, where a considerably greater radial cutting force may be required to initiate and accomplish a required cut than is possible with many embodiments of the apparatus of this invention. However, the invention may still find use in the cutting or machining of pipes of certain metals or metal alloys, in addition to plastics materials, if their hardness is suitably low such as to permit efficient initiation of a cut by the cutting tool under the achievable radial biasing force of the biasing means of the cutter assembly.

According to a second aspect of the present invention, there is provided, in combination, a pipe cutting apparatus according to the first aspect of the invention together with a pipe to be cut or machined, the pipe being mounted within the frame of the apparatus. The pipe is preferably clamped in position within the frame by means of the preferred clamping means.

According to a third aspect of the present invention, there is provided a method of cutting or machining a pipe, especially a pipe of plastics or resin material, comprising placing the pipe to be cut within the frame of an apparatus according to the first aspect of the invention, and rotating the cutting means with respect to the pipe while the cutting means is biased generally radially inwardly with respect to the pipe under the biasing force of the biasing means.

In preferred embodiments of this method using preferred embodiments of the apparatus as defined above, upon completion of the cutting operation the complete preferred frame assembly can be opened up by first releasing the preferred over-centre locking clamp(s) and then by swinging the preferred top half of the frame up and clear of the pipe, thus allowing the pipe to be lifted out or the apparatus to be swung clear of the pipe. Because of the simplicity of the cutting mechanism, the complete apparatus, and in particular the cutting assembly thereof, may be cleaned and indeed maintained in an optimum clean condition for example by simply washing it over with water, such as from a hosepipe or other water supply.

BRIEF DESCRIPTION OF THE DRAWINGS

A preferred embodiment of the invention in its various aspects will now be described in detail, by way of example only, with reference to the accompanying drawings, in which.

DETAILED DESCRIPTION OF PREFERRED EMBODIMENTS AND BEST MODE OF CARRYING OUT THE INVENTION

Figure 1:
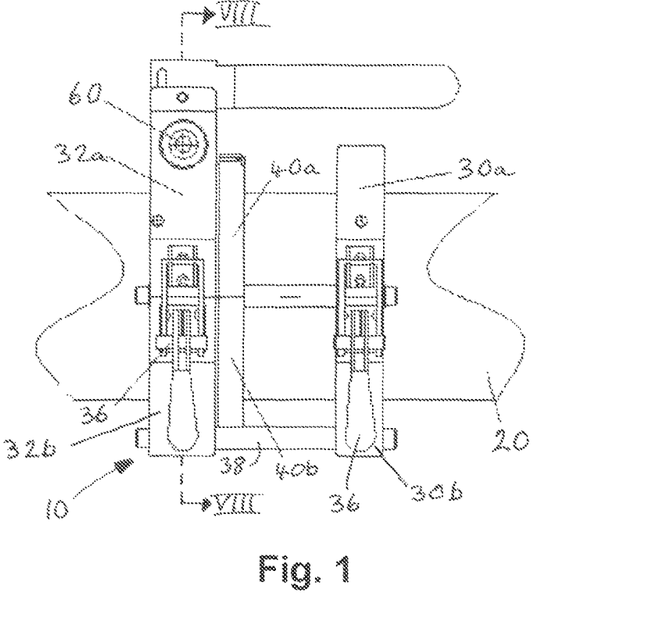
FIG. 1 is a side elevational view of the general assembly of the pipe cutting apparatus of the preferred embodiment, shown mounted on a pipe to be cut.
Figure 2:
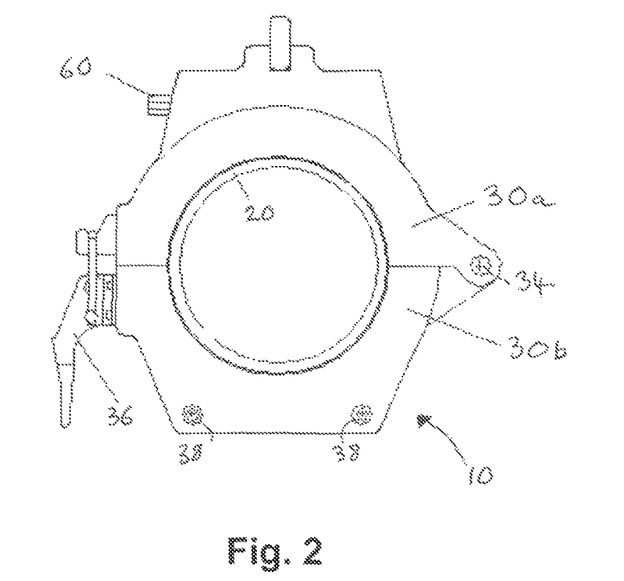
FIG. 2 is a front elevational view of the assembly, including the pipe cutting apparatus of the preferred embodiment, of FIG. 1.
Figure 3:
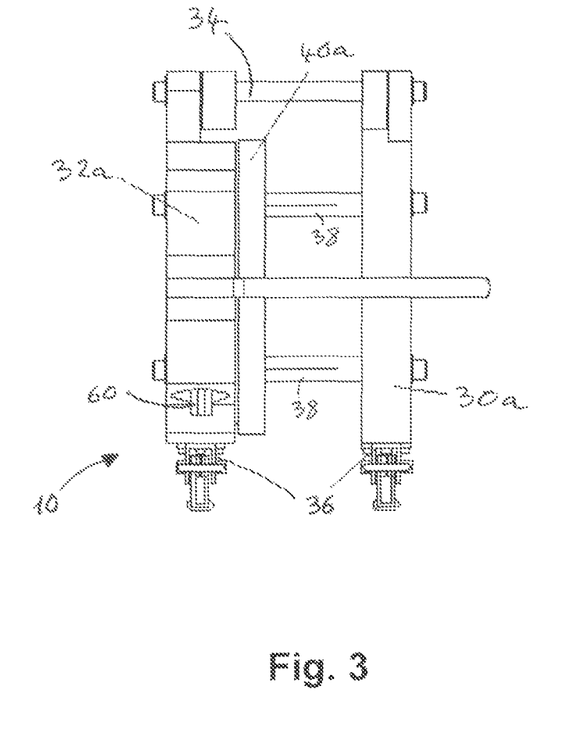
FIG. 3 is a top plan view of the pipe cutting apparatus of the preferred embodiment (without the pipe to be cut)
Figure 4:
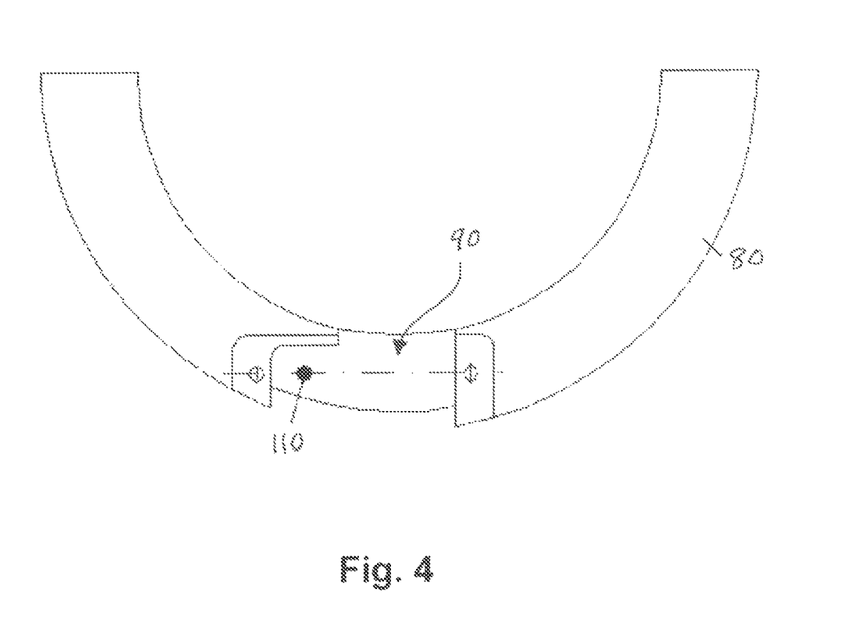
FIG. 4 is an explanatory cut-away view of a portion of the pipe cutting apparatus of the preferred embodiment, showing the portion of the rotatable tool carrier ring containing the recess for housing the cutter assembly, and showing a cutting tool pivot pin alone in place within the recess.
Figure 5:
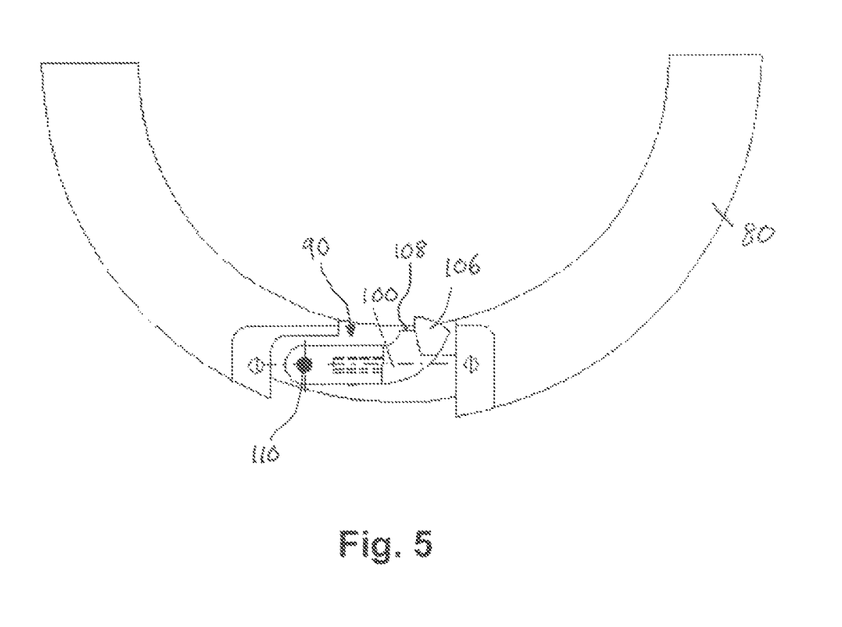
FIG. 5 is an explanatory cut-away view corresponding to FIG. 4, but showing a tool holder in position mounted on the pivot pin within the recess in the tool carrier ring.
Figure 6:
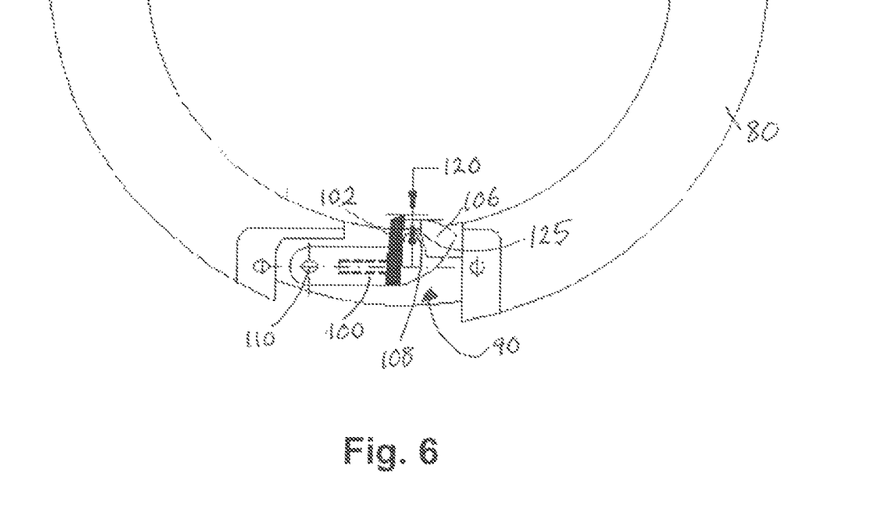
FIG. 6 is an explanatory cut-away view corresponding to FIG. 5, but showing a cutting tool mounted in the tool holder on the pivot pin inside the recess in the tool carrier ring.

Referring firstly to FIGS. 1, 2 and 3, the preferred pipe cutting or machining apparatus, shown generally as 10, is mounted on a pipe 20, such as a plastics (eg. PVC) water supply pipe, and clamps it securely between upper 30a, 32a and lower 30b, 32b semi-cylindrical frame sections. The frame is split between forward 30 and rear 32 frame parts, with each upper frame section 30a, 32a of the two frame parts being connected to its corresponding respective lower frame section 30b, 32b by elongate parallel connecting rods 38. The respective upper and lower pairs of frame sections 30a, 30b; 32a, 32b are hinged together by hinge rod 34 (FIG. 2).

(Although not shown in the Figures, the pairs of frame sections 30a, 30b; 32a, 32b may each carry two or more adjustable screws or other adjustment means which can be brought into engagement with the exterior of the pipe 20 once it has been located within the frame, and suitably adjusted in a known manner to accurately centre and locate the frame concentrically with respect to the pipe.)

Once the pipe 20 has been positioned within the frame 30a, 30b, 32a, 32b, the respective upper and lower frame sections are then secured by means of a pair of over-centre locking clamps 36, one on each frame part 30, 32. The axial spacing of the forward and rearward clamping frame parts 30, 32 and respective over-centre locking clamps 36 helps to stabilise the pipe within the frame and thus assist in optimising the accuracy of the cutting operation as the cutting head assembly revolves about the pipe.

Figure 8:
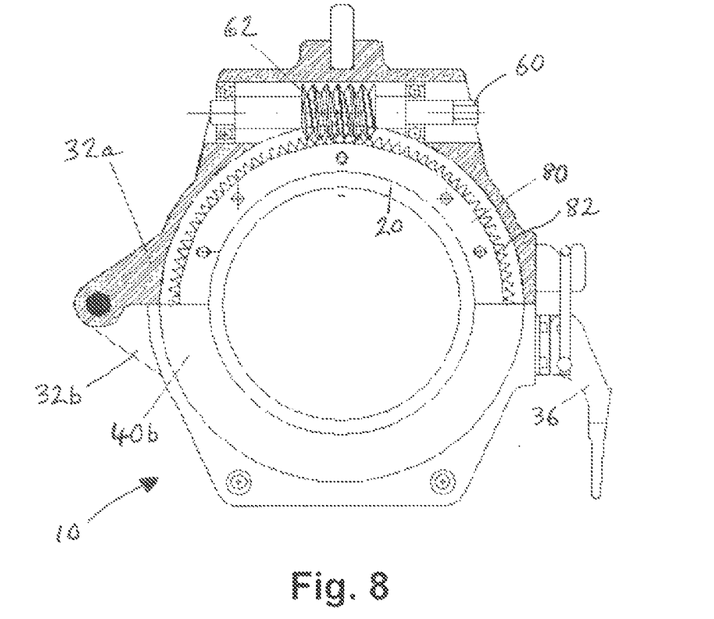
FIG. 8 is a rear cut-away part-sectional view of the apparatus and pipe assembly of FIG. 1 (on lines VIII-VIII of FIG. 1), showing in detail the rotatable tool carrier and its rotational drive mechanism.

Within the rearward frame part 32 is provided the rotatable cutting head assembly as will now be described in more detail, including with reference temporarily to FIG. 8. The rotatable cutting head assembly is carried on a rotatable tool carrier 40 consisting of upper 40a and lower 40b tool carrier sections. The tool carrier 40 comprises an internal annular tool carrier ring 80 which is mounted on a rotational axially-oriented bearing (not shown) located within a corresponding annular channel or cavity machined (or moulded) inside the rearward frame part 32. The tool carrier ring 80 comprises a toothed gear wheel 82 which meshes with worm gear 62 located within the upper rearward frame part 32a. The worm gear 62 is drivable from outside the apparatus by an external power source, which could be manual but more preferably is an electric motor, eg. an electric power drill.

Figure 9:
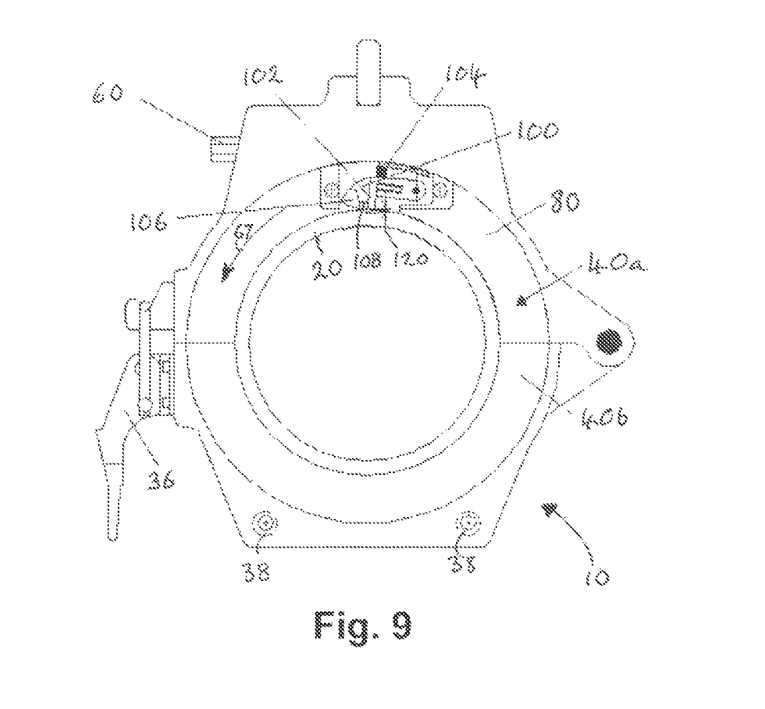
FIG. 9 is a part-cut-away front-elevational view of the apparatus and pipe assembly corresponding to that of FIG. 2, showing in detail the components of the cutter assembly.

The cutting head assembly itself is shown in detail in FIGS. 4, 5, 6 and 7 in its various stages of assembly of its various components. The complete cutting head assembly can be seen in situ in the apparatus as shown in FIG. 9, but is more clearly illustrated in the enlarged view thereof in FIG. 10.

Figure 7:
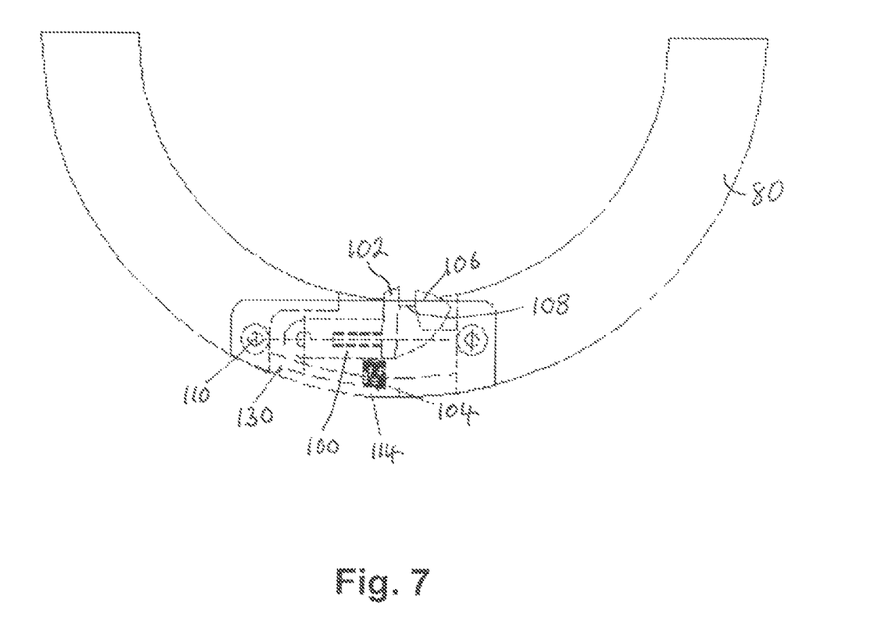
FIG. 7 is an explanatory cut-away view corresponding to FIG. 6, but showing the complete cutter assembly, including a biasing spring located on a spring retainer within the recess in the tool carrier ring and a cover plate in place closing off the recess.

As seen in these Figures, the cutting head assembly is carried on carrier ring 80 in a recess or cavity 90 formed therein, eg. by machining or moulding. The principal components of the cutter head assembly are:

cutting tool 102, eg. a steel cutting blade with a sharp forward cutting tip or edge 102a, tool holder 100, which is mounted on pivot pin 110, has the cutting blade 102 mounted thereon, and comprises guide shoe 106 and limiting stop bar 108;

biasing coil spring 104, which is mounted on a spring retaining lug, spigot or pin 114 and exerts its substantially constant biasing force against the tool holder 100 in a direction radially inwardly with respect to the pipe 20.

As the annular tool carrier ring 80 revolves about its central bearing within the annular channel inside the frame part 32 under the power of the externally powered drive means, the carrier ring 80 rotates in the anticlockwise direction shown by arrow 67 in FIG. 9. As a result of this motion, the end of the tool holder 100 distal from its pivot pin 110 is forced in a generally radially inward direction under the generally radially inwardly directed biasing force of the spring 104, ie. inwards towards the central axis of the pipe 20. In so doing, the sharp forward cutting tip or edge 102a of the cutting tool 102 comes into contact with the outer surface of the pipe 20 and naturally begins to cuttingly engage the surface, digging into it and beginning the cut as the cutting head assembly begins its anticlockwise revolving passage around the pipe 20.

The depth to which the cutting tool 102 penetrates the outer surface of the pipe 20 is limited to the predetermined spacing 120 (FIG. 10) defined by the radial distance between the tip 102a of the cutting tool 102 and the leading lower (ie. radially innermost) edge of the guide shoe 106 of the tool holder 100. Thus, in a single given revolution of the cutting head assembly around the pipe 20, the radial spacing distance 120 represents the maximum depth of a single given cut achievable by a single pass of the cutting tool across the pipe's outer surface.

As already discussed hereinabove, by appropriate selection of the size, shape and configuration of the cutting tool 102 mounted in the tool holder 100, together with the positioning of the pipe or pipe end portion within the frame, it is possible to achieve varying types and arrangements of cut in the pipe's outer surface or wall or even end surface or lip, as desired or as necessary.

Such cutting or machining operations may for example be selected from: complete cutting through of the pipe wall, especially with a transverse cut; partial cutting-through of the pipe wall; stripping of an outer layer from the surface of the pipe, eg. in a region adjacent an end thereof; beveling, chamfering or other shaping of one or more pre-cut end surface(s) of the pipe or its mouth or lip. Cutting tools appropriate for any given cutting or machining operation will be readily identifiable by and available to persons skilled in the art.

Upon completion of the requisite number of revolutions of the cutting head assembly around the pipe 20, each revolution being to its maximum depth represented by spacing distance 120, to achieve the overall desired total depth of cut, the limiting stop bar 108 then comes into play. As the maximum overall total cut depth is reached, the limiting stop bar 108 comes into contact with the outer surface of the pipe immediately adjacent (ie. immediately bordering) the cut, and rides (ie. slides) upon it as rotation of the cutting assembly across the outer surface of the pipe continues. As a consequence, further cutting down into the pipe surface by the cutting tool 102 is prevented. At this stage, upon this condition being attained, rotation of the cutting head about the pipe can be stopped by disconnection or stopping of the drive means 60, thereby terminating the cutting operation.

Finally, with the cutting or machining operation now complete, the frame of the cutting/machining apparatus can be opened up by releasing the over-centre locking clamps 36, thereby enabling the pipe 20 to be lifted out from the frame (or the frame can be released from around, or swung clear of, the pipe).

Figure 10:
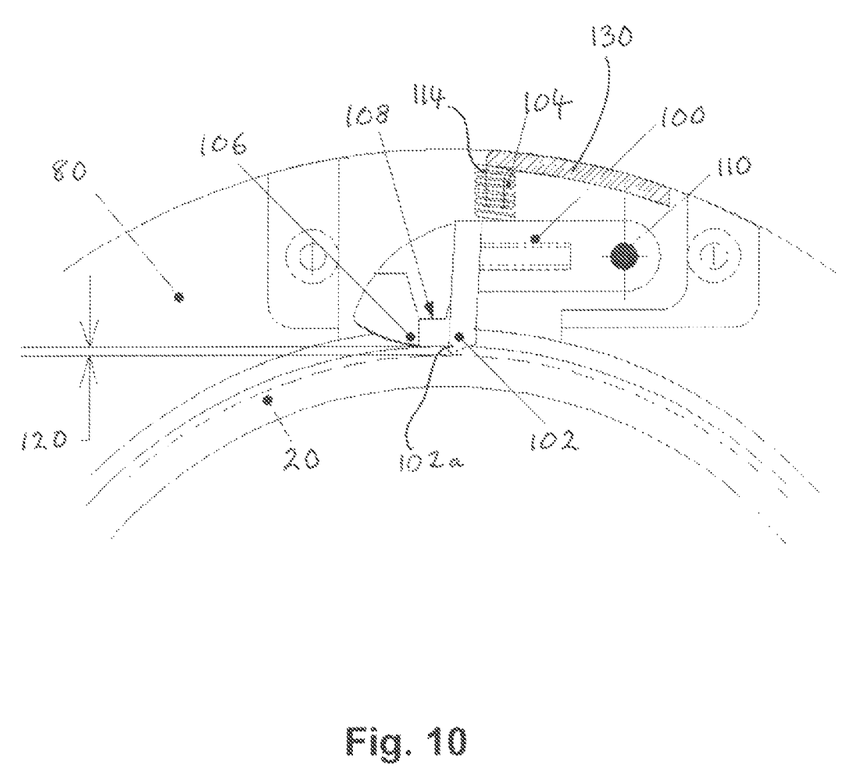
FIG. 10 is an enlarged view of the cutter assembly shown in FIG. 9.

The cutting head assembly, comprising its various components as shown in FIGS. 7 and 10, is substantially closed off and sealed from the outside by a cover plate 130, which for example may be secured in place by screws or bolts (not shown). The cover plate 130 serves to prevent or inhibit ingress of dirt, sand or other debris into the cutter assembly mechanism, thereby helping to avoid damage to and prolong the working life of its various components.

It is to be understood that the above description of a preferred embodiment of the invention in its various aspects has been by way of non-limiting example only, and various modifications may be made from what has been specifically described and illustrated whilst remaining within the scope of the invention as claimed.

The invention claimed is:

1. A pipe cutting apparatus comprising a frame for receiving a pipe to be cut, and cutting means, the cutting means and the pipe being relatively rotatable with respect to each other to perform a cut, wherein the cutting means comprises a cutting tool biased into cutting relationship with the pipe by biasing means, wherein:

the cutting means comprises the cutting tool carried on a tool holder mounted pivotally on or with respect to the frame, wherein the tool holder comprises a guide shoe in which the cutting tool is carried, the guide shoe comprises a leading edge which defines between it and a tip of the cutting tool remote from the guide shoe a first distance defining the maximum depth of a single given cut able to be performed in a single pass by the cutting tool as it is rotated with respect to a pipe held in the frame, and the tool holder additionally comprises limiting means located radially outwardly of the guide shoe, the limiting means comprising a riding edge which defines between it and a tip of the cutting tool remote from the limiting means a second distance defining the maximum depth of a plurality of cuts able to be performed by that plurality of cuts of the cutting tool as it is rotated through that plurality of cutting rotations with respect to a pipe held in the frame.

2. A pipe cutting apparatus according to claim 1, wherein the biasing of the cutting means into its cutting relationship with the pipe is independent of its rotational position with respect to the pipe and also independent of the number of revolutions it may have completed with respect to the pipe in an overall multi-revolution cutting procedure.

3. A pipe cutting apparatus according to claim 1, wherein the biasing means acts on the cutting means with a substantially constant biasing force directed generally radially inwardly with respect to the pipe.

4. A pipe cutting apparatus according to claim 1, further comprising drive means for rotating the cutting means and the frame relative to each other.

5. A pipe cutting apparatus according to claim 1, wherein the cutting means is carried on a rotatable tool carrier in the form of a circular or annular ring mounted on an axially oriented circular rotational bearing arranged within the frame.

6. A pipe cutting apparatus according to claim 5, wherein the rotatable tool carrier ring is contained within an annular channel (or cavity) machined or moulded into the frame.

7. A pipe cutting apparatus according to claim 5, wherein the cutting means is located within a machined or moulded recess (or cavity) formed in a section of the rotatable tool carrier ring.

8. A pipe cutting apparatus according to claim 1, wherein the cutting tool is selected from cutting tools constructed and/or configured for performing any of the following cutting or machining operations:
   complete cutting-through of the pipe wall;
   partial cutting-through of an outer surface or wall of the pipe;
   stripping of one or more outer layers from the outer surface of the pipe to allow the pipe to be joined to another;
   removal of irregularities from the outer surface of the pipe, for providing a cut end of the pipe with a clean, smooth outer surface of substantially uniform diameter to allow the pipe to be joined to another;
   bevelling, chamfering or other shaping of the edge(s) of a cut pipe end, mouth or lip.

9. A pipe cutting apparatus according to claim 1, wherein the cutting means are bounded or shielded by one or more cover means.

10. A pipe cutting apparatus according to claim 1, wherein the frame comprises a pair of articulated symmetrical frame sections hinged with respect to each other to permit a pipe to be inserted therebetween and the frame sections closed around the pipe to clamp it therebetween.

11. A pipe cutting apparatus according to claim 10, wherein the frame includes at least one locking means for locking the frame sections in their closed, clamping configuration.

12. A pipe cutting apparatus according to claim 10, wherein the frame includes adjustment means for altering the internal diameter of the space between the frame sections, whereby the frame can accommodate and clamp pipes of varying diameter.

13. A pipe cutting apparatus according to claim 10, wherein the frame comprises a first frame part for primarily supporting and clamping the pipe at a first axial location thereon and on which is mounted the cutting means, and a second frame part axially spaced from the first frame part for secondarily supporting and clamping the pipe at a second axial location spaced from the first axial location on the pipe.

14. In combination, a pipe cutting apparatus according to claim 1 together with a pipe to be cut or machined, the pipe being mounted within the frame of the apparatus.

15. A method of cutting or machining a pipe, the method comprising placing the pipe to be cut or machined within the frame of an apparatus according to claim 1, and rotating the cutting means with respect to the pipe while the cutting means is biased generally radially inwardly with respect to the pipe under the biasing force of the biasing means.

16. A method according to claim 15, wherein the pipe is of plastics, resin or of soft metallic material.

17. A method according to claim 15, which is a method of performing any one of the following cutting or machining operations:
   complete cutting-through of the pipe wall;
   partial cutting-through of an outer surface or wall of the pipe;
   stripping of one or more outer layers from the outer surface of the pipe, to allow the pipe to be joined to another by butt-fusion;
   removal of irregularities from the outer surface of the pipe, for providing a cut end of the pipe with a clean, smooth outer surface of substantially uniform diameter to allow the pipe to be joined to another by electro-fusion;
   bevelling, chamfering or other shaping of the edge(s) of a cut pipe end, mouth or lip.

* * * * *